United States Patent
Friedrich (10) Patent No.: US 9,648,386 B2
(45) Date of Patent: May 9, 2017

(54) PROTECTION FROM SPOILERS

(71) Applicant: ECHOSTAR TECHNOLOGIES L.L.C., Englewood, CO (US)

(72) Inventor: Alisson Emilio Friedrich, Marietta, GA (US)

(73) Assignee: EchoStar Technologies L.L.C., Englewood, CO (US)

( * ) Notice: Subject to any disclaimer, the term of this patent is extended or adjusted under 35 U.S.C. 154(b) by 0 days.

(21) Appl. No.: 14/586,517

(22) Filed: Dec. 30, 2014

(65) Prior Publication Data
US 2016/0191999 A1  Jun. 30, 2016

(51) Int. Cl.
| | |
|---|---|
| H04N 7/173 | (2011.01) |
| H04N 21/454 | (2011.01) |
| H04N 21/433 | (2011.01) |
| H04N 21/475 | (2011.01) |
| H04N 21/488 | (2011.01) |
| H04N 21/482 | (2011.01) |

(52) U.S. Cl.
CPC ..... H04N 21/4542 (2013.01); H04N 21/4334 (2013.01); H04N 21/4755 (2013.01); H04N 21/4821 (2013.01); H04N 21/4826 (2013.01); H04N 21/4882 (2013.01)

(58) Field of Classification Search
CPC ............... H04N 21/482; H04N 21/472; H04N 21/44008; H04N 21/4542
See application file for complete search history.

(56) References Cited

U.S. PATENT DOCUMENTS

| | | | | |
|---|---|---|---|---|
| 2010/0166389 | A1* | 7/2010 | Knee | G11B 27/005 386/241 |
| 2013/0275519 | A1* | 10/2013 | Nichols | G06Q 10/107 709/206 |
| 2014/0101706 | A1* | 4/2014 | Kardatzke | H04N 21/4334 725/86 |

* cited by examiner

*Primary Examiner* — Olugbenga Idowu
(74) *Attorney, Agent, or Firm* — Seed Intellectual Property Law Group LLP (57) ABSTRACT

Methods and devices protect users from spoilers associated with programs that have been scheduled to be recorded. A content receiver receives a request to record a program and outputs data corresponding to a user interface that enables a user to indicate whether protection from spoilers is desired for the program. When the content receiver receives data indicating a channel, the content receiver determines whether a currently received program being broadcast on the channel would spoil any of the programs for which the user has requested protection from spoilers. If the content receiver determines that the currently received program is a spoiler, it outputs data corresponding to a user interface that prevents the currently received program from been seen or heard. The user interface may provide an option to view the currently received program or to view a recording of a program that would be spoiled by the currently received program.

20 Claims, 8 Drawing Sheets

PROTECTION FROM SPOILERS

BACKGROUND

Technical Field

The present application relates to devices that receive and record content.

Description of the Related Art

Conventionally, a user may schedule a television program to be recorded and, before viewing the recording of the television program, the user may view the ending of the television program as it is being broadcast or re-broadcast. This can result in the ending of the television program being spoiled for the user. For example, the user may schedule a soccer game to be recorded and subsequently, before the user has viewed the recording of the soccer game, the user may change the channel displayed by his television to a channel on which the soccer game is being broadcast and see or hear the final score, which can spoil the soccer game for the user.

Accordingly, there is a need for methods and devices that protect users from spoilers.

BRIEF SUMMARY

A content receiver includes a peripheral device interface, at least one processor, and a non-transitory processor-readable storage medium storing processor-executable instructions that, when executed by the processor, cause the content receiver to protect users from spoilers. The content receiver receives a request to record a first program. The peripheral device interface then outputs data corresponding to a first user interface input relating to protection from spoilers. In response, the content receiver may receive data indicating that a user is to be protected from spoilers for the first program. Subsequently, the content receiver receives data indicating a currently received program and a channel for that program, and determines whether the currently received program broadcast on the channel is a spoiler for the first program. If the content receiver determines that the currently received program is a spoiler, the peripheral device interface outputs data corresponding to a second user interface input. The content receiver then receives data responsive to the second user interface input indicating a recording of the first program or the currently received program. In response, the peripheral device interface outputs data corresponding to a program indicated by the data responsive to the second user interface input.

The data corresponding to the second user interface input prevents the currently received program from being seen and/or heard by a user. When the data corresponding to the second user interface input is displayed by a display device, the second user interface input may be visible from the display device and a video portion of the currently received program may be invisible from the display device. When the data corresponding to the second user interface input is displayed by an audiovisual device, an audio portion of the currently received program may be inaudible from the audiovisual device. The second user interface input may enable a user to indicate whether the user would like to view the currently received program, a recording of the first program, or another program being broadcast on another channel.

To determine whether the currently received program is a spoiler for the first program, the content receiver may obtain an identifier of the currently received program from electronic program guide data based on the data indicating the channel and data indicating a current time. Additionally, the content receiver may determine whether the identifier of the currently received program is associated with data indicating protection from spoilers. For example, the content receiver may identify a data structure that includes the identifier of the currently received program, and determine whether the data structure includes the data indicating protection from spoilers.

DETAILED DESCRIPTION

Figure 1:
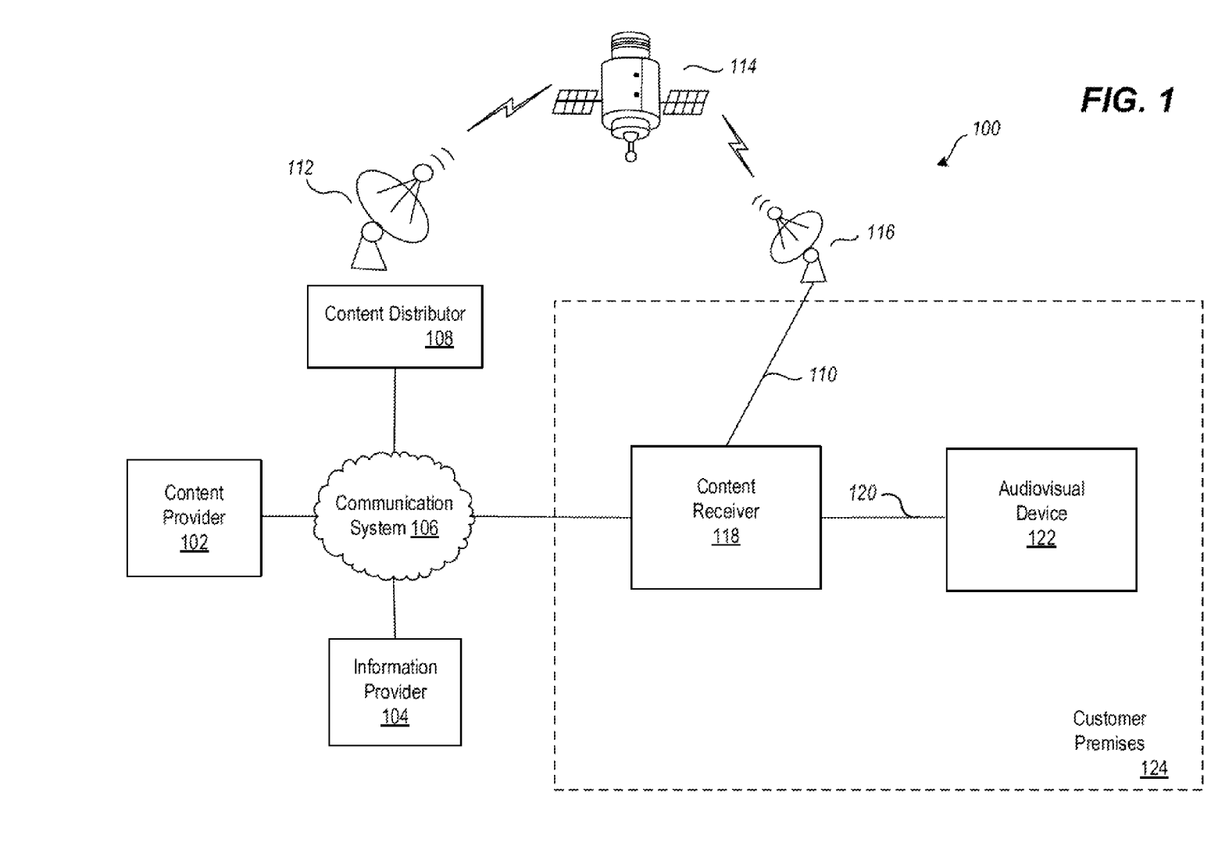
FIG. 1 is a network diagram of a content distribution system, according to one embodiment.

FIG. 1 is a network diagram of a content distribution system 100 according to one embodiment. The content distribution system 100 may be used to provide a subscription satellite service, for example. Content providers 102 (e.g., ABC, CBS, NBC, HBO, ESPN) and other information providers 104 (e.g., TV Guide) provide programming content (e.g., audio/video/data included in television programs) and related information (e.g., electronic programming guide data) via a communication system 106 to a content distributor 108. The content distributor 108 combines signals including the programming content and related information into a signal 110 that is transmitted from a transmitter 112 to a satellite 114, which retransmits the signal 110 to a dish 116.

The dish 116 outputs the signal 110 to a content receiver 118 (e.g., a set top box, content receiver, etc.). The content receiver 118 includes one or more tuners and typically demodulates the signal, demultiplexes out a desired service, decodes it from digital format, and reformats it into an appropriate analog or digital video signal in a predetermined format (e.g., National Television Standards Committee (NTSC), Phase Alternate Lines (PAL), and Advanced Television Standards Committee (ATSC)). The content receiver 118 may then output a signal 120, as appropriate, to an audiovisual device 122 (e.g., a television, display, stereo amplifier, VCR). Although only one audiovisual device 122 is illustrated in FIG. 1, the content receiver 118 may output signals to more than one audiovisual device 122. For example, the content receiver 118 may output a signal including an audio portion of a television program to a stereo amplifier and also output a signal including a video portion of the television program to a television. The content receiver 118 and the audiovisual device 122 may be located in a customer's premises 124, usually a home. In addition, the content receiver 118 may be capable of receiving content from other devices (e.g., VCR, DVD player).

Figure 2:
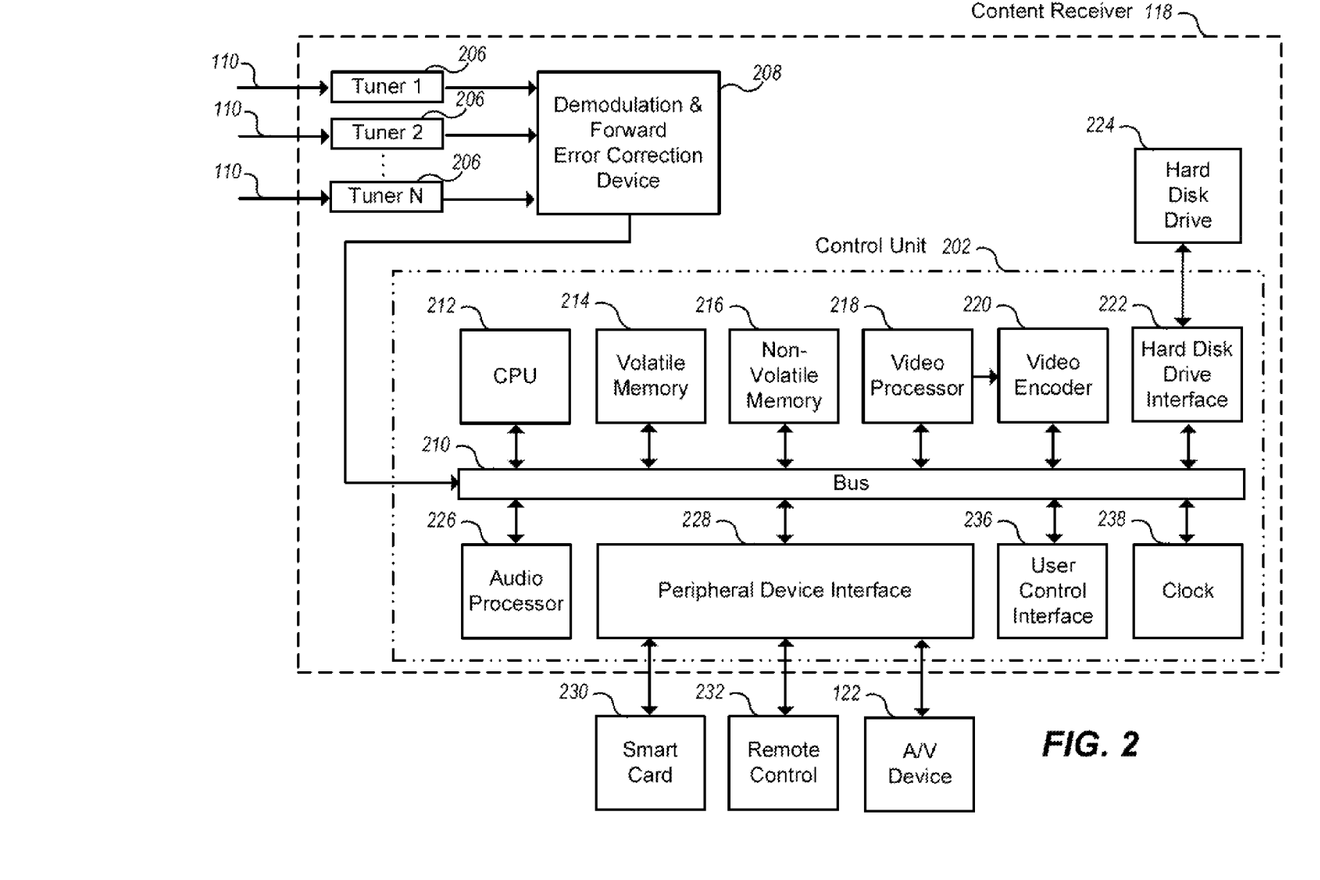
FIG. 2 is a block diagram of a content receiver, according to one embodiment.

FIG. 2 is a high level block diagram of the content receiver 118 according to one embodiment. The content receiver 118 may be a set-top box or cable or satellite television converter device having DVR functionality, for example. Additionally, the content receiver 118 may be a mobile telephone, a tablet computer, or a personal computer, for example.

The signal 110 that is input to the content receiver 118 is typically processed prior to being output from the content receiver 118. The content receiver 118 may include one or more tuner devices 206, which may receive the signal 110 broadcast from the content distributor 108 shown in FIG. 1, for example. The tuners 206 may receive commands in the form of signals from a control unit 202. Such commands may cause each of the tuners 206 to tune to a particular frequency band corresponding to a television channel that a subscriber would like to view on a peripheral device and/or would like to record in the content receiver 118.

Signals output from the tuners 206 are provided to a demodulation and forward error correction device 208. The signal 110 may be an analog or digital signal onto which data is modulated. The demodulation and forward error correction device 208 demodulates the signal 110 according to known modulation methods to recover the data. Such modulation methods may include amplitude modulation (AM) or frequency modulation (FM). If the data is transmitted in a digital format, the modulation methods may include bi-phase-shift keying (BPSK), quadrature phase-shift keying (QPSK), or eight-phase shift keying (8PSK), for example. The demodulation and forward error correction device 208 also may process the data according to known forward error correction (FEC) methods. Such methods may include inspecting parity bits included in the data.

Signals output from the demodulation and forward error correction device 208 are provided to the control unit 202. Various components of the control unit 202 may be included in one or more integrated circuits. The control unit 202 may operate under the control of a software program, firmware program, or some other program stored in memory or control logic. The control unit 202 may include fewer, more, or different components from those shown in FIG. 2 and described below.

The control unit 202 includes a shared bus 210 that communicatively couples at least one central processing unit (CPU) 212, a volatile memory 214, and a non-volatile memory 216. The non-volatile memory 216 may store control programs that are loaded into the volatile memory 214 and executed by the CPU 212. Additionally, the volatile memory 214 and/or the non-volatile memory 216 may store other data, such as electronic program guide (EPG) data.

The control unit 202 may include at least one video processing unit 218 that decodes and processes an encoded signal 110. The video processing unit 218 may include a graphics processor, a MPEG-2 decoder, and a display compositor with on-screen display (OSD) control for peripheral devices, for example. Also, the control unit 202 may include a video encoder unit 220 that may work in combination with the video processing unit 218 to encode a digital stream 118 for output to one or more peripheral devices, for example, a television. The video encoder 220 may translate a digital stream into a signal according to the NTSC, PAL, or SECAM standards.

The control unit 202 also may include at least one hard disk drive interface 222 and a hard disk drive 224. The hard disk drive interface 222 may provide a standard ATA/ATAPI interface or IDE/EIDE interface for transferring information to and from the hard disk drive 224. The hard disk drive 224 may store recorded programs, buffered data from a program being viewed, EPG data, an operating system, control programs, timers, or other data. The hard drive 232 may be external and connected to the content receiver 118, for example, using a USB 2.0 or IEEE 1394 (FireWire) connection.

In addition, the control unit 202 may include an audio processor 226. The audio processor 226 may decode a digital stream 110 for output to one or more peripheral devices, such as a stereo amplifier or a television. For example, the audio processor 226 may decode MPEG-1 layers I/II and layer m, Dolby Digital, Dolby ProLogic, SRS/TruSurround encoded audio data that is included in a digital stream 110.

The control unit 202 may be connected to one or more peripheral devices through a peripheral device interface 228. Such peripheral devices may include a smart card 230, a remote control 232, and the audiovisual device 122. The smart card 230 may store subscriber account information and/or security information. The remote control 232 may wirelessly transmit signals to the content receiver 118 using UHF or IR communications. Such signals may indicate a television channel, which will cause the control unit 202 to change the frequency band to which one of the tuners 206 is tuned, process the signal output from that tuner 206, and provide the processed signal to a coaxial cable connector included in the peripheral device interface 228, which is connected to a coaxial cable that also is connected to the audiovisual device 122, for example. Although only one audiovisual device 122 is shown in FIG. 2, the peripheral device interface 228 may provide connections to more than one audiovisual device 122. The audiovisual device 122 may display graphical information corresponding to television programming content and/or user interface screens provided by the content receiver 118. Additionally, the audiovisual device 122 may output sounds corresponding to the television programming content or user interfaces.

The content receiver 118 may communicate with other peripheral devices via the peripheral device interface 228. Such peripheral devices may include a modem, a wireless communication device, and/or a wired communication device. For example, the content receiver 118 may utilize a modem to transmit data used to order pay-per-view programming or to receive EPG data using a standard telephone cable that is attached to the peripheral device interface 228 using a RJ-11 style connector. Also, the content receiver 118 may utilize the wired communication device to receive EPG data or software update data using an Ethernet cable that is attached to the peripheral device interface 228 using a RJ-45 style connector.

The control unit 202 may include a user control interface 236. The user control interface 236 may receive signals from buttons and/or a keypad of the content receiver 118. For example, a user may operate the keypad to power the content receiver 118 on and off, and to change the channel of the programming content that is being output from the peripheral device interface 228.

The content receiver 118 also may include a clock 238. The clock 238 outputs a signal indicative of the current date and time. For example, the CPU 212 may utilize the output from the clock 238 to determine whether to begin or to end recording of programming content. Additionally, the CPU 212 may utilize the output from the clock 238 to determine what television program is currently being broadcast on a particular channel. For example, the content receiver 118 may store EPG data or other scheduling information that identifies the television programs scheduled to be broadcast on each channel during a particular time period, which may include a start time, an end time, a title, a category, a type, and a textual description of each television program. The CPU 212 may use the output from the clock 238 and a channel identifier to determine the title or other unique identifier of the television program that is scheduled to be broadcast on a channel at the current time.

Figure 3:
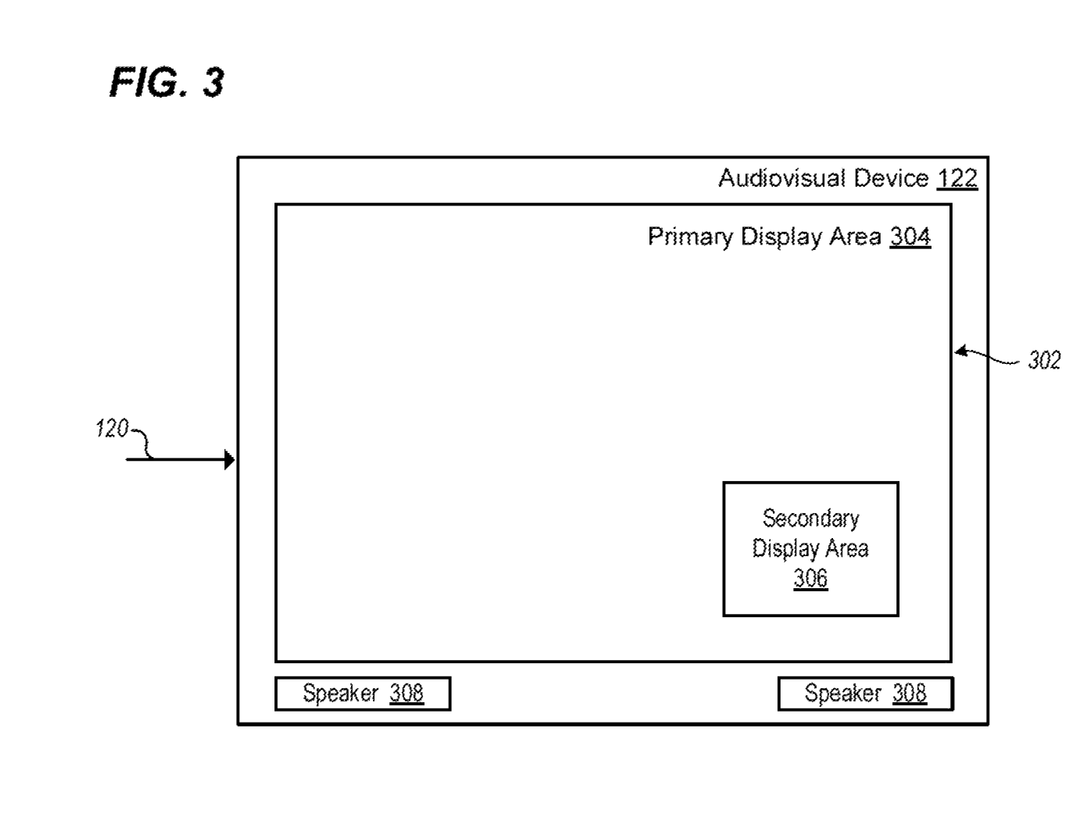
FIG. 3 is a schematic diagram of an audiovisual device, according to one embodiment.

FIG. 3 is a schematic diagram of an audiovisual device 122, according to one embodiment. The audiovisual device 122 includes a display device 302 that can display images corresponding to the video portion of programming content. The display device 302 includes a primary display area 304 and a secondary display area 306, which may be smaller than the primary display area 304. The audiovisual device 122 also includes speaker 308 that can output sounds corresponding to the audio portion of programming content. For example, the speakers 308 may output sounds corresponding to an audio portion of a television program and the primary display area 304 may display images corresponding to the video portion the television program. The secondary display area 306 may be used to display a so-called "picture in a picture" that includes images corresponding to the video portion of a different television program. Sounds corresponding to the audio portion of the television program being displayed in the secondary display area 306 generally are not output from the speakers 308. In one embodiment, the audiovisual device 122 is integrated with the content receiver 118. For example, the audiovisual device 122 may be part of a mobile telephone, a tablet computer, or a personal computer that also includes the content receiver 118.

Figure 4:
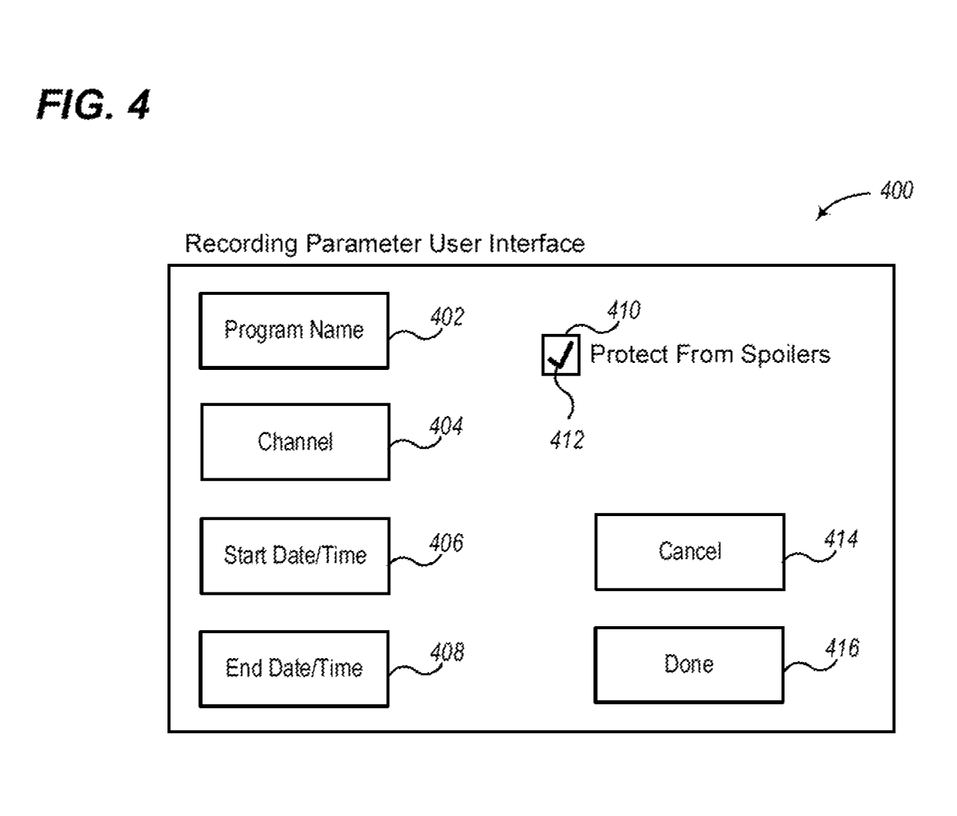
FIG. 4 is a schematic diagram of a recording parameter user interface, according to one embodiment.

FIG. 4 is a schematic diagram of a recording parameter user interface 400, according to one embodiment. The user interface 400 may be displayed in response to a user issuing a request to schedule a recording of a television program. For example, the content receiver 118 may generate data corresponding to the user interface 400 that is provided to the audiovisual device 122 for displaying. The user interface 400 may include a display area 402 in which the name or other identifier of the television program to be recorded is displayed, a display area 404 in which the channel on which the television program will be broadcast is displayed, a display area 406 in which the scheduled start date and time of the television program are displayed, a display area 408 in which the scheduled end date and time of the television program are displayed. One or more of the display areas 402-408 may be text entry areas that the user can select and enter the information that is displayed using an input device (e.g., remote control 232). Additionally or alternatively, one or more of the display areas 402-408 may be populated automatically in response to a user using an input device to select the title of the television program from a list of displayed television programs, for example.

The user interface 400 also may include a selectable spoiler interface input 410 that would appear on display 122 that a user can use an input device (e.g., remote control 232) to select. For example, the selectable spoiler interface input 410 may be a check box the user may select to indicate that the user is to be protected from spoilers for the program being scheduled for recording. The selectable user interface input 410 may display a visual indication 412 (e.g., a check mark) after the user selects spoiler protection to provide confirmation that the user is to be protected from spoilers for the program being scheduled for recording. The user interface 400 also may include a selectable user interface input 414 that the user may select to indicate that scheduling of the recording of the television program is to be canceled. Additionally, the user interface 400 may include a selectable user interface input 416 that the user may select to indicate that the information entered or displayed via the user interface 400 is to be used to schedule the recording of the television program.

In other embodiments, the spoiler interface may be much simpler and be a two screen presentation. For example, if a user is watching a program and presses "record" on the remote control, the selectable spoiler interface input 410 can then appear on the screen and give the user the option to check the box to protect from spoilers. Similarly, if the user is viewing the Electronic Programming Guide (EPG) and selects a future program to record, a dialog box 410 can then appear or pop up and ask whether the user wishes to protect this program from spoilers.

Figure 5:
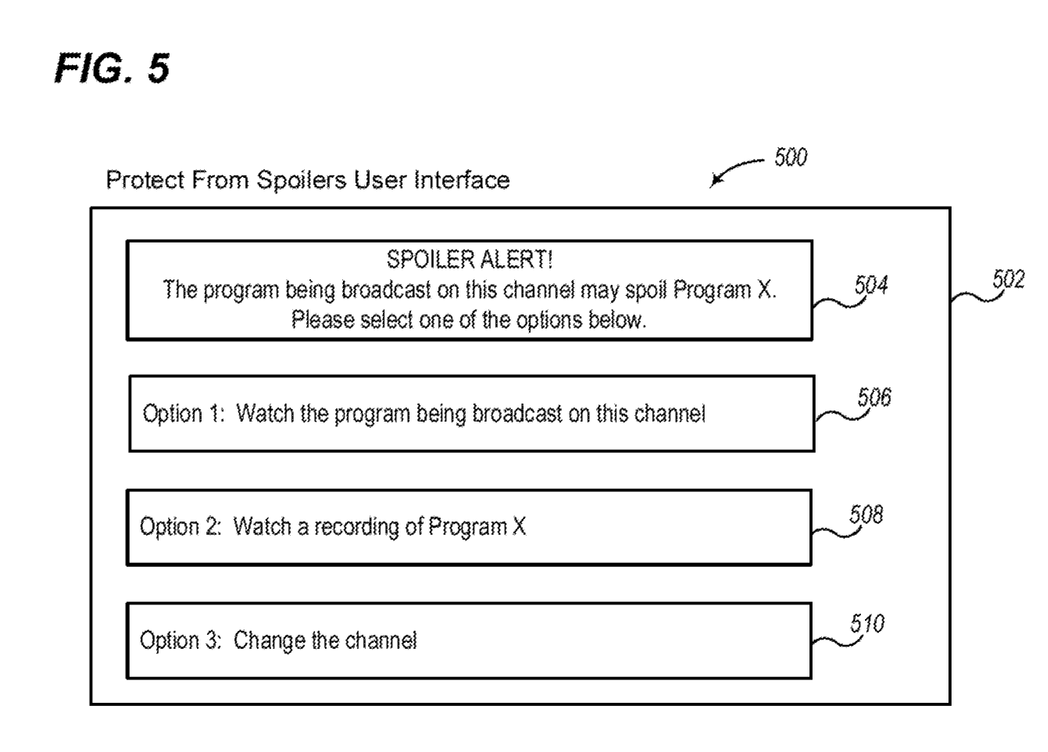
FIG. 5 is a schematic diagram of a protection from spoilers user interface, according to one embodiment.

FIG. 5 is a schematic diagram of a protection from spoilers user interface 500 that would appear on display 122, according to one embodiment. The content receiver 118 may output data corresponding to the protection from spoilers user interface 500 to the audiovisual device 122 for displaying when a user attempts to view a television program being broadcast on a channel, after the user has scheduled the television program to be recorded. The protection from spoilers user interface 500 includes a display area 502 on which a display area 504 is displayed. The display area 504 will include a message that warns the user that she is attempting to view a television program that may spoil another program. The protection from spoilers user interface 500 also includes a selectable area 506 that the user can select to indicate that she would like to watch the television program being broadcast on the current channel. Additionally, the protection from spoilers user interface 500 includes a selectable area 508 that the user can select to indicate that she would like to watch a recording of a television program that has been protected from spoilers, for example, from the beginning of the television program. The protection from spoilers user interface 500 also includes a selectable area 510 that the user can select to indicate that she would like to change the channel to view another television program.

Figure 6:
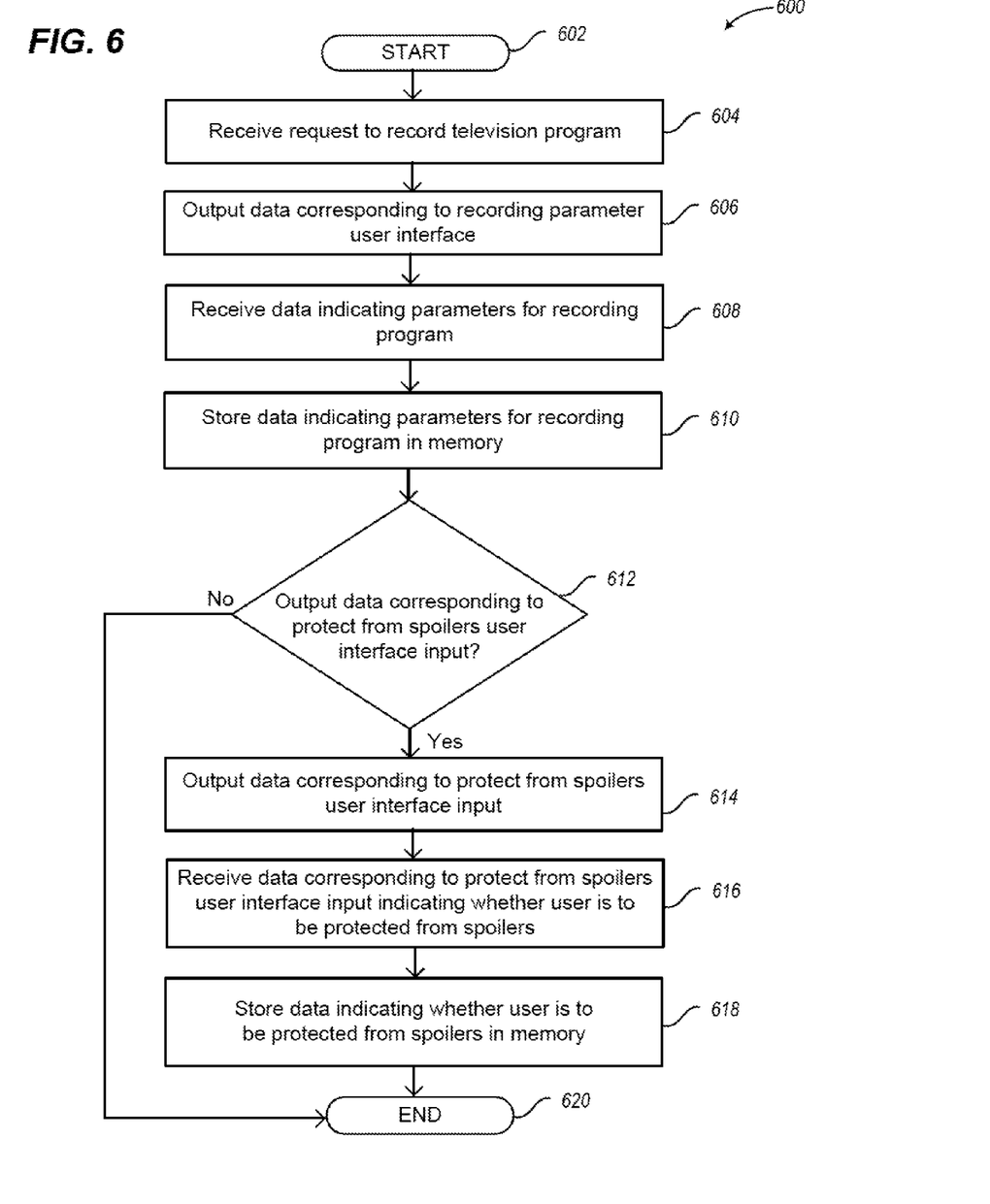
FIG. 6 is a flowchart of a process for protecting a user from spoilers, according to one embodiment.

FIG. 6 is a flowchart 600 of a process for protecting a user from spoilers, according to one embodiment. The process may be performed by the content receiver 118. The volatile memory 214, the non-volatile memory 216, and/or the hard disk drive 224 may store processor-readable instructions that, when executed by the CPU 212, cause the content receiver 118 to perform the various acts depicted in the flowchart 600.

The process begins at 602. At 604, the content receiver 118 receives data indicating a request to record a television program. For example, the CPU 212 may receive data from a data buffer stored in the volatile memory 214, which includes data received from the peripheral device interface 228 corresponding to a user selection for scheduling the recording of the television program made using the remote control 232. Additionally or alternatively, the CPU 212 may receive data from a data buffer stored in the volatile memory 214, which includes data received from the user control interface 236 corresponding to a user selection for scheduling the recording of the television program made using a keypad or button of the content receiver 118.

At 606, the content receiver 118 outputs data corresponding to a recording parameter user interface. For example, the content receiver 118 may output the data to the audiovisual device 122, which causes at least part of the recording parameter user interface 400 shown in FIG. 4 to be displayed in the primary display area 304.

At 608, the content receiver 118 receives data indicating parameters for recording the television program. Such parameters may include data indicating the name of the television program, a channel on which the television program will be broadcast, a start date and time of the television program, and an end date and time of the television program. For example, the CPU 212 may receive from the volatile memory 214 parameter data that corresponds to the data displayed in display areas 402-408 of the recording parameter user interface 400 shown in FIG. 4. Additionally or alternatively, the CPU 212 may receive the parameter data from EPG data stored in the non-volatile memory 216 and/or the hard disk drive 224, in response to a user making one or more selections using the remote control 232.

At 610, the content receiver 118 stores the data indicating the parameters for recording the television program received at 608 in a memory. For example, the CPU 212 may cause the hard disk drive 224 to store the data indicating the parameters for recording the television program in a table or other data structure associated with setting a timer used to record the television program.

At 612, the content receiver 118 determines whether to output data corresponding to a protect from spoilers user interface input. The determination may be made using the data indicating the parameters for recording the television program received at 608 and/or stored EPG data. For example, the CPU 212 may use the parameter data indicating the name of the television program to retrieve corresponding information that is included in EPG data (or other data) that indicates a category or type of the television program.

The processor-readable instructions stored by the volatile memory 214, the non-volatile memory 216, and/or the hard disk drive 224 may include control logic indicating that the content receiver 118 is to update the data corresponding to the recording parameter user interface output at 606 to include the protect from spoilers user interface input if a category or type associated with the television program is included in a list of one or more predetermined categories or types. For example, the CPU 212 may determine that the data corresponding to the user interface 400 shown in FIG. 4 is to be updated to include the protect from spoilers user interface input 410 if the CPU 212 determines that the category or the type of the television program indicates that the television program is a live sporting event or if the category or the type of the television program indicates that it is the first time an episode of a series is being broadcast.

If the content receiver 118 determines at 612 not to output the data corresponding to the protect from spoilers user interface input, the process ends at 620. If the content receiver 118 determines at 612 to output the data corresponding to the protect from spoilers user interface input, the process proceeds to 614.

At 614, the content receiver 118 outputs the data corresponding to the protect from spoilers user interface input. For example, the CPU 212 may receive from the non-volatile memory 216 the data corresponding to the recording parameter user interface initially output at 606 and update that data to include the data indicating the parameters for recording the television program received at 608, and the cause the peripheral device interface 228 to output the resulting data to the audiovisual device 122. When the data is displayed by the audiovisual device 122, for example, the recording parameter user interface 400 shown in FIG. 4 is displayed with the selectable user interface input 410, which may not be included in the user interface 400 by default.

At 616, the content receiver receives data corresponding to the protect from spoilers user interface input indicating whether the user is to be protected from spoilers for the television program. For example, the CPU 212 may receive the data corresponding to the protect from spoilers user interface input indicating whether the program is to be protected from spoilers in response to a user selecting the selectable area 416 shown in FIG. 4 using the remote control 232. The CPU 212 may receive the data corresponding to the protect from spoilers user interface input indicating whether the program is to be protected from spoilers from a data buffer in the volatile memory 214, which may store data corresponding to a value assigned to the selectable user interface input 410 (e.g. a value indicating whether the selectable user interface input 410 has been selected or deselected by the user).

At 618, the content receiver stores data indicating whether the user is to be protected from spoilers in a memory. The CPU 212 may cause the data indicating whether the program is to be protected from spoilers to be stored in the hard disk drive 224. For example, the CPU 212 may add or update a field of a table or other data structure associated with setting a timer used to record the television program such that the value of a variable included in the field is set to a predetermined value (e.g., "1") indicating that the program is to be protected from spoilers.

Figure 7A:
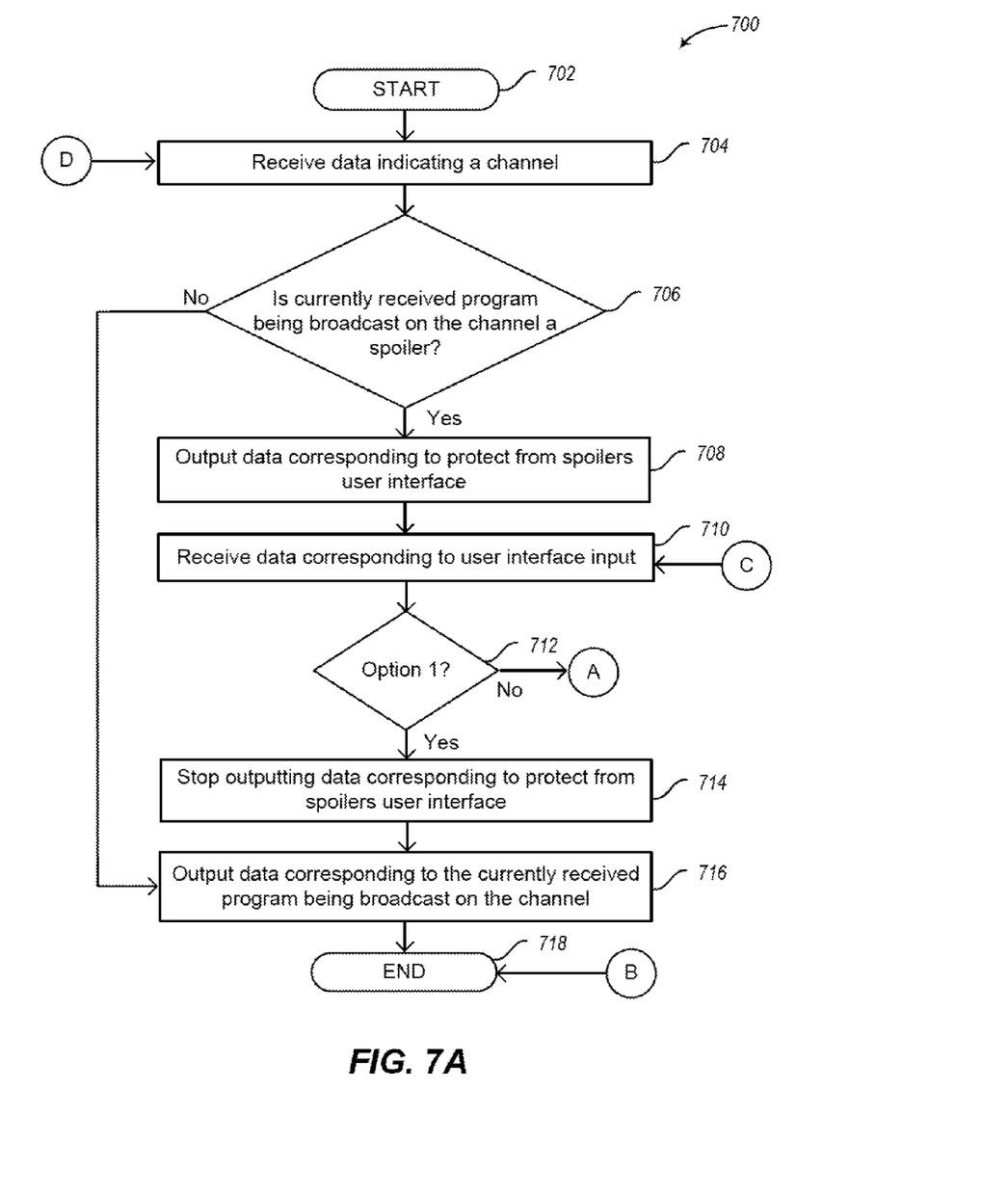
FIGS. 7A and 7B illustrate a flowchart of a process for protecting a user from spoilers, according to one embodiment.
Figure 7B:
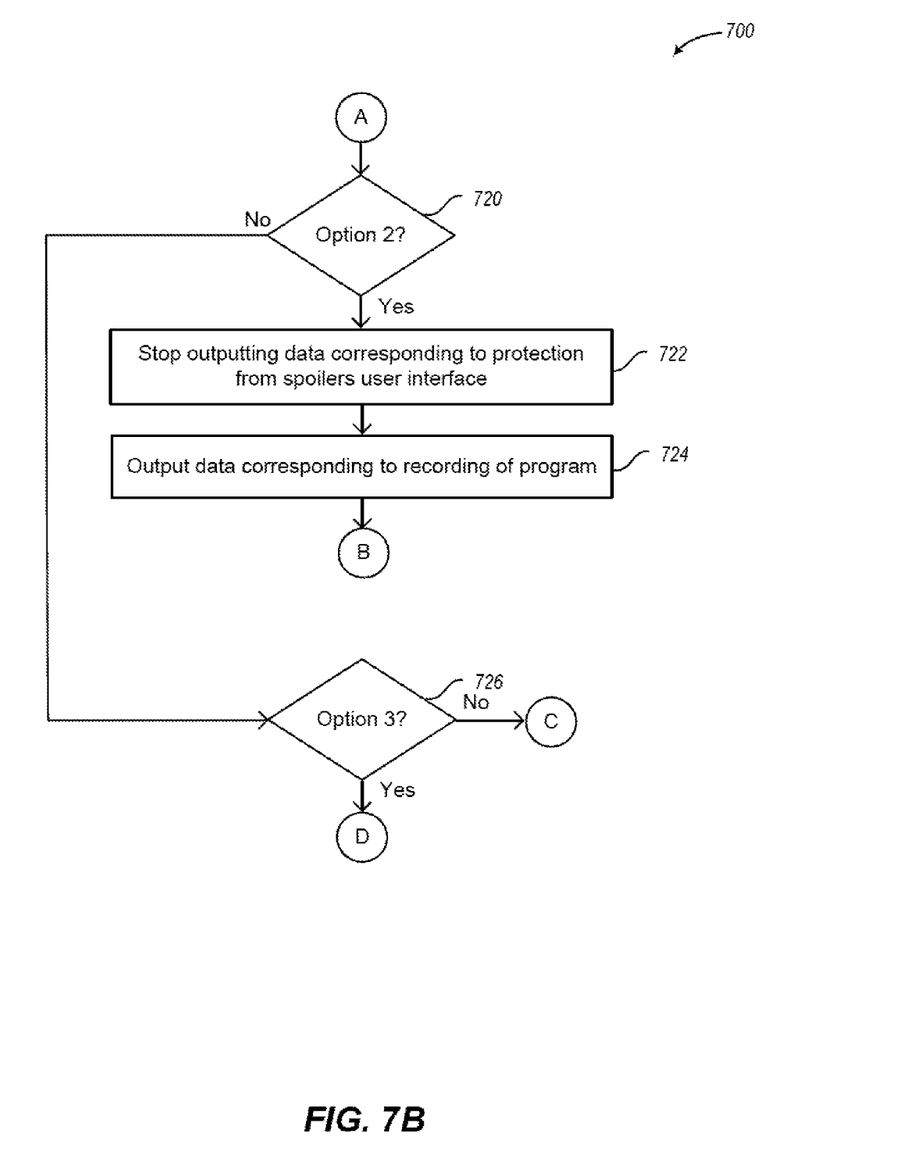

FIGS. 7A and 7B illustrate a flowchart 700 of a process for protecting a user from spoilers, according to one embodiment. The process may be performed by the content receiver 118. The volatile memory 214, the non-volatile memory 216, and/or the hard disk drive 224 may store processor-readable instructions that, when executed by the CPU 212, cause the content receiver 118 to perform the various acts depicted in the flowchart 700 of the process.

The process begins at 702. At 704, the content receiver 118 receives data indicating a channel. For example, the CPU 212 may receive the data indicating the channel from a data buffer stored in volatile the memory 214, which includes data received from the peripheral device interface 228 corresponding to a user selection made using the remote control 232. Additionally or alternatively, the CPU 212 may receive data indicating the channel from a data buffer stored in the volatile memory 214, which includes data received from the user control interface 236 corresponding to a user selection made using a keypad or button of the content receiver 118. Additionally or alternatively, if the user has just powered on the content receiving, for example, the CPU 212 may receive data from the volatile memory 214 and/or the non-volatile memory 216 indicating a channel that was output from the content receiver 118 that last time it was powered on.

At 706, the content receiver 118 determines whether a currently received program being broadcast on the channel is a spoiler for any recorded programs for which a user has requested protection from spoilers. The CPU 212 may receive from the clock 238 data indicating the current date and time. The CPU 212 may use the data indicating the current date and time and the data indicating the channel to obtain an identifier associated with the currently received program that is being broadcast on the channel. The CPU 212 may obtain the identifier associated with a television program (e.g., the title of the television program) from EPG data. For example, the CPU 212 may search EPG data provided by TV Guide that is associated with the channel for a television program that has a scheduled start date and time that is before the current date and time and a scheduled end date and time that is after the current date and time, and obtain the corresponding title of the television program from the EPG data.

The content receiver 118 then determines whether the currently received program being broadcast on the channel is a spoiler. For example, the CPU 212 searches tables or other data structures associated with television programs that have been recorded or that are scheduled to be recorded, which may be stored by the hard disk drive 224, and obtains an identifier (e.g., name) of each television program for which a user has requested protection from spoilers. Such tables or other data structures also may indicate whether a user has played back a recording of the television program.

For example, the content receiver 118 may store a table or other data structure for a television program that includes a field "Spoiler_Protect=Yes" and a field "Played_Back=No", which indicate that a user has requested to be protected from spoilers for the television program and the user has not yet played back a recording of the television program. The field "Spoiler_Protect=Yes" may be stored at 618 in response to a user selecting the selectable user interface input 410 shown in FIG. 4.

After the CPU 212 obtains an identifier of each television program for which protection from spoilers has been requested and a recording thereof has not yet been played back, the CPU 212 determines whether the currently received television program is a spoiler for each such program. The processor-readable instructions stored by the volatile memory 214, the non-volatile memory 216, and/or the hard disk drive 224 may include control logic indicating rules for determining whether each identified television would be spoiled if the user is permitted to view the currently received television program.

One such rule may cause the CPU 212 to determine that a first television program is a spoiler for a second television program if an identifier of the first television program is the same as an identifier of the second television program. For example, the CPU 212 determines that the first television program is a spoiler for the second television program if the first and the second television programs have the same title.

According to another such rule, the CPU 212 may determine that a first television program is a spoiler for a second television program if an identifier of the first television program partially matches an identifier of the second television program. For example, the identifier of the first television program may include the title of the first television program, a season number of the first television program, and an episode (or game) number of the first television program; the identifier of the second television program may include the title of the first television program, a season number of the second television program, and an episode (or game) number of the second television program. If the title and season number of the first television program match the title and season number of the second television program and, if the episode number of the first television program is greater than the episode (or game) number of the second television program, the CPU 212 determines that the first television program is a spoiler for the second television program. Thus, a user may be protected from viewing the latest episode of a television series if the user has not viewed a previous episode of the television series.

Additionally, the content receiver 118 (e.g., the hard disk drive 224) may store EPG data or other data that includes category or type information for television programs. Such data may include an identifier of a first television program and associated category information indicating that the first television program is a news program or a sports commentary program on a prior sports event, and an identifier of a recorded television program and associated category information indicating that the recorded television program is the sporting event itself. Another rule may cause the CPU 212 to determine that the first television program is a spoiler for the second television program if the category information for the first television program indicates a news program or a sports commentary program and the category information for the recorded television program indicates a sporting event. Such a rule will protect a user from viewing a program in which the final score of a soccer game is announced if the user has not already viewed a recording they made of the soccer game, for example.

The following are other examples in which the spoiler prevention program may be helpful or beneficial. Assume a user has selected to record a particular football program, whether it is their favorite college program, a pro sports program, or the super bowl. The set-top box has a record that a particular sporting event, such as the football game, has been recorded and the user has marked it to prevent spoilers. At some later point in time, the user turns on the TV so that they have a chance to watch the previously recorded sporting program. If the user turns to a news reporting station or a sports commentary station indicating that it provides a reporting of football scores for the day, or other sports scores, this would be a spoiler for the user to watch the entire football program to learn what happens during the game. Generally, such information regarding sports commentary or sports reporting programs are carried in the metadata, EPG, or other data associated with the program. Thus, the CPU receives input in the form of such metadata or EPG data that the commentary on sporting events at the end of the day will most likely provide the score and highlights from a football game played previously that same day. This will be an indication that the viewing of the sport commentary program after the conclusion of the sporting event itself will likely be a spoiler and, thus, the spoiler prevent screen as shown in FIG. 5 will be presented to the viewer so they can determine to not watch the sports commentary program or a news report having the final scores for the day prior to watching the football game itself.

One of the indications that a first program will be a spoiler for a previously recorded program would be the time of display of each. For example, a sporting news report, news program, or sporting commentary that occurs later in the same day than the event itself which is being recorded is a strong indication that it will likely be a spoiler for the previously occurring sporting event. In addition, halftime reports of previously occurring sporting events may be blocked according to the spoiler alert program. In addition to a time of a day and a time of broadcast sequence being important data points for determining if a program would be a spoiler, the metadata information, EPG content, and other information broadcast with the program itself will be of significant value to determine the likelihood that a later program is a spoiler for a prior program. For example, an analysis entitled "Super Bowl Report, Who Won and Why" would be an indication that this program will likely be a spoiler for the Super Bowl itself. Similarly, a report entitled "College Football Analysis" which is broadcast at the end of the day Saturday evening indicates that it would likely be a spoiler for any college football game which occurred on Friday or Saturday prior to the college football scoreboard analysis.

Of significant interest in the present disclosure is the ability to block parts of programs which might be spoilers for partially completed sporting events. For example, suppose one member of the household is an Alabama fan while another member of the household is a Notre Dame fan. If Alabama and Notre Dame are playing football games at different locations, but at the same time, the two viewers in the household will watch one game in its entirety from start to finish and, after it is finished, they will turn and watch the other game in its entirety. This way each user of the household gets to enjoy their favorite football team, such as Alabama, and view a complete game, after which the other member of the household gets the benefit of watching their preferred football team, Notre Dame, play an entire complete game without one of the games spoiling the other. However, it is common during half-time, or in between quarters, of one sporting event to broadcast the highlights or scores from other programs, particularly the football scores.

For example, the half-time report of the Alabama game may very well provide the highlights of the Notre Dame game during its own half-time or during the progress of the playback game, such as during third quarter, or toward the end of the game. Similarly, there may be box scores partway through the Alabama games which pop up and indicate the current score or a particular play in the Notre Dame game. Such announcements in the middle of the Alabama game will be a spoiler for someone who wishes to watch the Notre Dame game from the beginning in its entirety. Accordingly, when the Alabama game goes to a half-time report and has that sequence of events, the spoiler alert will receive data of the current program being displayed on the TV and an indication that half-time has started and half-time commentary is present and will, therefore, output the spoiler alert screen of FIG. 5 to the user so that they can skip over the half-time, place it on pause, or take other action in order to avoid having a spoiler for the Notre Dame game. Similar spoiler protection pop ups may also occur if the play of current program is interrupted to show play from another football program that is then in progress. The above is one alternative embodiment that may be carried out in some designs of the spoiler alert program, though it is not required in all embodiments.

According to another embodiment, the spoiler alert program is also operative for the program itself if it is not yet completely concluded. For example, if a user wishes to record the Alabama football game so they may watch the game in its entirety and enjoy the game. The user may arrive home during the middle of the third quarter and, if they turn on the TV in the middle of the third quarter would see the Alabama game at its current time, which would be a spoiler for watching the game from the initial kickoff. This particular event is thus a spoiler for itself if the user arrives home and turns on the TV with just a quarter or a few minutes left to the end of the game. Therefore, according to one embodiment, the spoiler alert program is particularly sensitive to viewing of the recorded program prior to the program itself being completed. This is something which is easy to detect and can be an easy alert system inside the CPU and memory of the content receiver 118. In such a situation, the user selects a program to be recorded and then selects spoiler protection for that particular program. Then, if at a later point in time before the live program is concluded the user turns on the TV and turns to the channel on which that program is being presented on that particular channel, before displaying the current, live action on that channel, the spoiler protection alert screen of the type shown in FIG. 5 would be displayed in order to give the user a chance to protect themselves from watching the very end of the program which is being recorded before starting from the very beginning. The user would be given an option to start watching the program as recorded and/or go back to the very beginning and watch it from the beginning before seeing any parts of the current program live. The user could, therefore, select to watch the program from the very beginning as if it is a live program and see the entire event as it goes forward from the very start. The user may, if they wish, skip over commercials, fast forward to certain sequences in the program and, thus, may start to catch up to the live broadcast time before the broadcast is fully concluded. However, the user has been protected from turning on the TV toward the very end of a particular program, such as a favorite sporting event, and seeing the last few minutes of a game which they were recording in the hopes of seeing the entire game from its very beginning. In this embodiment, the second program is, in fact, the original program itself, which has not yet been concluded in the live performance and the user is prompted to go to the very beginning of the program to watch it from its start rather than just see the last portion of the program live by making use of the spoiler alert system as described herein.

While the situation in which a program is a spoiler for itself as its own program has been described with respect to a sporting event, such as football, soccer, basketball, or the like, it will be appreciated that this spoiler alert of one program being a spoiler itself may be used for other types of programs, for example, a suspenseful movie, a comedy event, a drama, a news report, a political debate, or some other event which is being programmed for which the user has indicated that they wish to see the program from the very beginning and avoid a spoiler. Thus, according to this embodiment, if the user has indicated they wish to be protected from spoilers for a program, one of the spoilers will be the program itself which will be protected from being viewed live or further along in its broadcast prior to the user having had an opportunity to watch the program from its very beginning.

If the content receiver 118 determines at 706 that the currently received program being broadcast on the channel is not a spoiler, the process proceeds to 716. If the content receiver 118 determines at 706 that the currently received program being broadcast on the channel is a spoiler, the process proceeds to 708.

At 708, the content receiver 118 outputs data corresponding to the protect from spoilers user interface. For example, the CPU 212 retrieves the data corresponding to the protect from spoilers user interface from the volatile memory 214, the non-volatile memory 216, and/or the hard disk drive 224 and causes the video encoder 220 to produce a corresponding signal that includes the data corresponding to the protect from spoilers user interface. The CPU 212 also causes the peripheral device interface 228 to output the signal produced by the video encoder 220 that includes the data corresponding to the protect from spoilers user interface.

For example, when the data corresponding to the protect from spoilers user interface is received and displayed by the audiovisual device 122 shown in FIG. 3, the protection from spoilers user interface 500 shown in FIG. 5 may be displayed such that the display area 502 covers the entire primary display area 304. Additionally, the signal that includes the data corresponding to the protect from spoilers user interface may carry audio data corresponding to a verbal warning message, which when processed by the audiovisual device 122 causes sounds corresponding to the verbal warning message to be emitted from the speakers 308.

Notably, the signal that includes the data corresponding to the protect from spoilers user interface may also block an audio portion of the currently received program that is being broadcast on the channel. For example, if a recorded program is a sports game that is almost finished, the user is protected from seeing a banner with the score of the protected game (i.e., a spoiler) that is broadcast with a different currently received program on another channel because the protect from spoilers user interface can be seen from the audiovisual device 122. Additionally, the user is protected from hearing a sports announcer say the score of the game (i.e., a spoiler) because the data corresponding to the protect from spoilers user interface does not include the audio portion of the television program.

In one embodiment, when the content receiver 118 outputs the protect from spoilers user interface data at 708, the signal output from the content receiver 118 also includes the video portion of the currently received program that is being broadcast on the channel. For example, when the signal output from the content receiver 118 is displayed by the audiovisual device 122, the protect from spoilers user interface is displayed in the primary display area 304 and the video portion of the currently received program that is being broadcast on the channel is displayed in the secondary display area 306. The content receiver 118 may display the protect from spoilers user interface in the primary display area 304 in response to a user attempting to switch the displaying of the video portion of the currently received program that is being broadcast on the channel from the secondary display area 306 to the primary display area 304. The signal output from the content receiver 118 does not include the audio portion of the currently received program that is being broadcast. Thus, when the video portion of the currently received program that is being broadcast on the channel is displayed in the secondary display area 306, the speakers 308 do not emit sounds corresponding to the audio portion of the currently received program. The spoiler prevention system may, thus, pause a display of a current event to give the user a choice to continue while FIG. 5 appears, or it may block all audio broadcast of an event.

At 710, the content receiver 118 receives data corresponding to a user interface input. For example, the CPU 212 may receive the data from a data buffer stored in volatile memory 214, which includes data received from the peripheral device interface 228 corresponding to a user selection made using the remote control 232. Additionally or alternatively, the CPU 212 may receive the data from a data buffer stored in volatile memory 214, which includes data received from the user control interface 236 corresponding to a user selection made using a keypad or button of the content receiver 118.

At 712, the content receiver 118 determines whether the data corresponding to the user interface input received at 710 corresponds to a first option. For example, the CPU 212 may determine whether the data corresponding to the user interface input corresponds to a selection of selectable user interface input 506 shown in FIG. 5. Additionally or alternatively, the CPU 212 may determine whether the data corresponding to the user interface input indicates "1", which corresponds to the selectable user interface input 506.

If the content receiver 118 determines at 712 that the data corresponding to the user interface input received at 710 does not correspond to the first option, the process proceeds to 720. If the content receiver 118 determines at 712 that the data corresponding to the user interface input received at 710 corresponds to the first option, the process proceeds to 714.

At 714, the content receiver 118 stops outputting the data corresponding to protect from spoilers user interface. For example, the CPU 212 causes the video encoder 220 to stop producing the signal that includes the data corresponding to the protect from spoilers user interface and/or causes the peripheral device interface 228 to stop outputting the signal that includes the data corresponding to the protect from spoilers user interface.

At 716, the content receiver 118 outputs data corresponding to the currently received program that is being broadcast on the channel. For example, the CPU 212 causes the output of a tuner 206 that is tuned to receive the channel to be processed by the video processor 218, video encoder 220, and the audio processor 228. Additionally, the CPU 212 causes the output of the video encoder 220 to be output from the peripheral device interface 228. The process then ends at 718.

As noted above, if the content receiver 118 determines at 712 that the data corresponding to the user interface input received at 710 does not correspond to the first option, the process proceeds to 720. At 720, the content receiver 118 determines whether the data corresponding to the user interface input received at 710 corresponds to a second option. For example, the CPU 212 may determine whether the data corresponding to the user interface input indicates a selection of selectable user interface input 508 shown in FIG. 5. Additionally or alternatively, the CPU 212 may determine whether the data corresponding to the user interface input indicates "2", which corresponds to the selectable user interface input 508.

If the content receiver 118 determines at 720 that the data corresponding to the user interface input received at 710 does not correspond to the second option, the process proceeds to 726. If the content receiver 118 determines at 720 that the data corresponding to the user interface input received at 710 corresponds to the second option, the process proceeds to 722.

At 722, the content receiver 118 stops outputting the data corresponding to the protect from spoilers user interface. For example, the CPU 212 causes the video encoder 220 to stop producing the signal that includes the data corresponding to the protect from spoilers user interface and/or causes the peripheral device interface 228 to stop outputting the signal that includes the data corresponding to the protect from spoilers user interface.

At 724, the content receiver 118 outputs data corresponding to a recording of a television program that would be spoiled by the currently received program, for example, from the beginning of the television program. For example, the CPU 212 causes the hard disk drive 224 to output stored program data that is processed by the video processor 218, video encoder 220, and the audio processor 228. Additionally, the CPU 212 causes the output of the video encoder 220 to be output from the peripheral device interface 228. The process then ends at 718.

As noted above, if the content receiver 118 determines at 720 that the data corresponding to the user interface input received at 710 does not correspond to the second option, the process proceeds to 726. At 726, the content receiver 118 determines whether the data corresponding to the user interface input received at 710 corresponds to a third option. For example, the CPU 212 may determine whether the data corresponding to the user interface input indicates a selection of selectable user interface input 510 shown in FIG. 5. Additionally or alternatively, the CPU 212 may determine whether the data corresponding to the user interface input indicates "3", which corresponds to the selectable user interface input 510.

If the content receiver 118 determines at 726 that the data corresponding to the user interface input received at 710 does not indicate the third option, the process proceeds back to 710 after the user selects another user interface input. If the content receiver 118 determines at 726 that the data corresponding to the user interface input received at 710 corresponds to the third option, the process proceeds back to 704 after the user enters another channel.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
   receiving a request to record a first program, the request being received by a content receiver;
   in response to receiving the request to record the first program, outputting data corresponding to a user interface that enables a user to specify a parameter used to schedule recording of the program;
   receiving data indicating the parameter used to schedule recording of the program;
   determining whether to update the data corresponding to the user interface that enables the user to specify the parameter used to schedule recording of the program to include a first user interface input that enables the user to specify whether the user is to be protected from spoilers for the first program based on the data indicating the parameter used to schedule recording of the program;
   in response to determining that the data corresponding to the user interface is to be updated, updating the data corresponding to the user interface to include the first user interface input that enables the user to specify whether the user is to be protected from spoilers for the first program;
   outputting the data corresponding to the user interface that includes the first user interface input that enables the user to specify whether the user is to be protected from spoilers for the first program, the data corresponding to the user interface that includes the first user interface input being output from the content receiver;
   in response to outputting the data corresponding to the first user interface input, receiving data indicating that the user is to be protected from spoilers for the first program that is to be recorded, prior to the first program being recorded by the content receiver;
   receiving data indicating a currently received program and a channel for that program, the data indicating the currently received program and the channel being received by the content receiver;
   determining whether the currently received program broadcast on the channel is a spoiler for the first program;
   outputting data corresponding to a second user interface input, the data corresponding to the second user interface input being output from the content receiver in response to determining that the currently received program is the spoiler for the first program;
   receiving data responsive to the second user interface input indicating a recording of the first program or the currently received program, the data responsive to the second user interface input being received by the content receiver; and
   outputting data corresponding to a program indicated by the data responsive to the second user interface input, the data corresponding to the program being output from the content receiver.

2. The method of claim 1 wherein the first program is the same as the currently received program.

3. The method of claim 1 wherein the first program is different from the currently received program.

4. The method of claim 1 wherein, when the second user interface input is displayed by a display device, the second user interface input is visible from the display device and a video portion of the program is invisible from the display device.

5. The method of claim 1 wherein, when the second user interface input is displayed by a display device, the second user interface is visible in a primary display area of the display device and a video portion of the currently received program is visible in a secondary display area of the display device.

6. The method of claim 1 wherein, when the second user interface input is displayed by an audiovisual device, an audio portion of the currently received program is inaudible from the audiovisual device.

7. The method of claim 1 wherein the data responsive to the second user interface input indicates the recording of the first program, the currently received program, or a third program.

8. The method of claim 1 wherein the determining whether the currently received program is the spoiler for the first program comprises:
   obtaining an identifier of the currently received program from electronic program guide data based on the data indicating the channel and data indicating a current date and time; and
   determining whether the identifier of the currently received program is associated with data indicating protection from spoilers.

9. The method of claim 8 wherein the determining whether the identifier of the program is associated with data indicating protection from spoilers comprises:
   identifying a data structure that includes the identifier of the program; and
   determining whether the data structure includes the data indicating protection from spoilers.

10. A content receiver, comprising:
    a peripheral device interface;
    at least one processor; and
    a non-transitory processor-readable storage medium storing processor-executable instructions that, when executed by the at least one processor, cause the content receiver to:
       receive a request to record a first program;
       in response to receiving the request to record the first program, output data corresponding to a user interface that enables a user to specify a parameter used to schedule recording of the program;
       receive data indicating the parameter used to schedule recording of the program;
       determine whether to update the data corresponding to the user interface that enables the user to specify the parameter used to schedule recording of the program to include a first user interface input that enables the user to specify whether the user is to be protected from spoilers for the first program based on the data indicating the parameter used to schedule recording of the program;

in response to determining that the data corresponding to the user interface is to be updated, update the data corresponding to the user interface to include the first user interface input that enables the user to specify whether the user is to be protected from spoilers for the first program;

output the data corresponding to the user interface that includes the first user interface input that enables the user to specify whether the user is to be protected from spoilers for the first program, the data corresponding to the user interface that includes the first user interface input being output from the peripheral device interface;

in response to outputting the data corresponding to the first user interface input, receive indicating that the user is to be protected from spoilers for the first program that is to be recorded, prior to the first program being recorded by the content receiver;

receive data indicating a currently received program and a channel for that program;

determine whether the currently received program broadcast on the channel is a spoiler for the first program;

output data corresponding to a second user interface input, the data corresponding to the second user interface being output from the peripheral device interface in response to determining that the currently received program is the spoiler for the first program;

receive data responsive to the second user interface input indicating a recording of the first program or the currently received program; and output data corresponding to a program indicated by the data responsive to the second user interface input, the peripheral device interface outputting the data corresponding to the program.

11. The content receiver of claim 10 wherein the first program is the same as the currently received program.

12. The content receiver of claim 10 wherein the first program is different from the currently received program.

13. The content receiver of claim 10 wherein, when the second user interface is displayed by a display device, the second user interface is visible from the display device and a video portion of the program is invisible from the display device.

14. The content receiver of claim 10 wherein, when the second user interface is displayed by a display device, the second user interface is visible in a primary display area of the display device and a video portion of the currently received program is visible in a secondary display area of the display device.

15. The content receiver of claim 10 wherein, when the user interface is displayed by an audiovisual device, an audio portion of the currently received program is inaudible from the audiovisual device.

16. The content receiver of claim 10 wherein the data responsive to the second user interface input indicates a recording of the first program, the currently received program, or a third program.

17. The content receiver of claim 10 wherein the processor-executable instructions, when executed by the at least one processor, cause the content receiver to:

obtain an identifier of the currently received program from electronic program guide data based on the data indicating the channel and data indicating a current date and time; and determine whether the identifier of the currently received program is associated with data indicating protection from spoilers.

18. The content receiver of claim 17 wherein the processor-executable instructions, when executed by the at least one processor, cause the content receiver to:

identify a data structure that includes the identifier of the program; and determine whether the data structure includes the data indicating protection from spoilers.

19. A method, comprising:

receiving a request from a user to record a program, the request being received by a content receiver;

in response to receiving the request to record the program, displaying a user interface that enables a user to specify a parameter used to schedule recording of the program;

in response to displaying the user interface that enables the user to specify the parameter used to schedule recording of the program, receiving data indicating the parameter used to schedule recording of the program;

determining whether to update the user interface that enables the user to specify the parameter used to schedule recording of the program to include a spoilers protection user interface input that enables a user to specify whether the user is to be protected from spoilers for the program, the determining being performed by the content receiver based on the parameter used to schedule recording of the program, prior to the program being recorded by the content receiver; and outputting the spoilers protection user interface input, the spoilers protection user interface input being output from the content receiver responsive to determining that the spoilers protection user interface input is to be output; and receiving input from the user that the program is to be protected to prevent spoilers from being output by the content receiver to a display.

20. The method of claim method 19 wherein the determining whether to output the spoilers protection user interface input is based on a category of the program or a type of the program.

* * * * *